(12) United States Patent
Chen et al.

(10) Patent No.: US 12,395,426 B2
(45) Date of Patent: Aug. 19, 2025

(54) MESSAGE INDICATION METHOD AND APPARATUS, AND DEVICE AND STORAGE MEDIUM

(71) Applicant: ZTE Corporation, Shenzhen (CN)

(72) Inventors: Ran Chen, Shenzhen (CN); Yubao Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 90 days.

(21) Appl. No.: 18/011,962

(22) PCT Filed: Feb. 20, 2021

(86) PCT No.: PCT/CN2021/077055
§ 371 (c)(1),
(2) Date: Dec. 21, 2022

(87) PCT Pub. No.: WO2021/258754
PCT Pub. Date: Dec. 30, 2021

(65) Prior Publication Data
US 2023/0344754 A1    Oct. 26, 2023

(30) Foreign Application Priority Data
Jun. 22, 2020 (CN) .......................... 202010577361.8

(51) Int. Cl.
*H04L 45/00* (2022.01)
*H04L 12/46* (2006.01)

(52) U.S. Cl.
CPC .......... *H04L 45/34* (2013.01); *H04L 12/4633* (2013.01); *H04L 12/4641* (2013.01); *H04L 45/66* (2013.01)

(58) Field of Classification Search
None
See application file for complete search history.

(56) References Cited

U.S. PATENT DOCUMENTS

2019/0289508 A1* 9/2019 Gundavelli ....... H04W 36/0033
2020/0099610 A1* 3/2020 Heron ..................... H04L 45/34

FOREIGN PATENT DOCUMENTS

| CN | 108259291 A | 7/2018 |
| CN | 109873760 A | 6/2019 |
| CN | 110661701 A | 1/2020 |
| CN | 110830352 A | 2/2020 |
| CN | 112511418 A | 3/2021 |
| WO | 2020060826 A1 | 3/2020 |

OTHER PUBLICATIONS

International Search Report for corresponding application PCT/CN2021/077055 filed Feb. 20, 2021; Mail date May 8, 2021.
"3GPP TR29.892, Technical Specification Group Core Network and Terminals, Study on User Plane Protocol in 5GC", Release 16, Oct. 31, 2018, http://222.3gpp.org, 20 pages.

* cited by examiner

*Primary Examiner* — Christine T Duong
(74) *Attorney, Agent, or Firm* — CANTOR COLBURN LLP

(57) ABSTRACT

Provided are a message indication method and apparatus, a device and a storage medium. The method is applied to a first node, and includes: receiving segment identifier (SID) information, the SID information including a message indication identifier, and the message indication identifier being used for indicating a forwarding situation of a message corresponding to the SID information; and processing the message on the basis of the SID information.

18 Claims, 5 Drawing Sheets

MESSAGE INDICATION METHOD AND APPARATUS, AND DEVICE AND STORAGE MEDIUM

CROSS-REFERENCE TO RELATED APPLICATION

The present disclosure claims priority to Chinese Patent Application No. CN202010577361.8, filed on Jun. 22, 2020, and entitled "Message Indication Method and Apparatus, Device and Storage Medium", the disclosure of which is hereby incorporated by reference in its entirety.

TECHNICAL FIELD

The present disclosure relates to the technical field of communications, specifically to a message indication method and apparatus, a device and a storage medium.

BACKGROUND

FIG. 1 is a structural diagram of a running service between PEs in an SRv6 virtual private network (VPN) all active scenario. As shown in FIG. 1, in the SRv6 VPN all active scenario, a custom edge (CE) is dual-homed to provide edges (PE2 and PE3), and a SRv6 VPN service runs between the PEs. A fast rerouting mechanism is deployed between PE2 and PE3. After a service message sent by CE1 to CE2 is sent to PE2, if a link between PE2 and CE2 fails, PE2 changes an IPV6 destination of an outer layer of the service message into an SRv6 service SID on PE3 and sends the message to PE3.

If a link between PE3 and CE2 also fails, PE3 will replace the IPV6 destination of the outer layer of the service message with an SRv6 service SID on PE2 and send the message to PE2, resulting in service message looping between PE2 and PE3. The service looping will consume forwarding resources and affect the user experience.

SUMMARY

The present disclosure provides a message indication method and apparatus, a device and a storage medium, so as to avoid service message looping between provide edges and improve the user experience.

In a first aspect, an embodiment of the present disclosure provides a message indication method. The method is applied to a first node, and includes: receiving segment identifier (SID) information, the SID information including a message indication identifier, and the message indication identifier being used for indicating a forwarding situation of a message corresponding to the SID information; and processing the message on the basis of the SID information.

In a second aspect, an embodiment of the present disclosure provides a message indication apparatus. The apparatus is configured to a first node, and includes: a receiving module, configured to receive SID information, the SID information comprising a message indication identifier, and the message indication identifier being used for indicating a circumventing situation of a message corresponding to the SID information; and a processing module, configured to process the message on the basis of the SID information.

In a third aspect, an embodiment of the present disclosure provides a device, including: one or more processors; and a memory, configured to store one or more programs. The one or more programs, when executed by the one or more processors, cause the one or more processors to perform any one of the methods provided in the embodiment of the present disclosure.

In a fourth aspect, an embodiment of the present disclosure provides a computer-readable storage medium, which stores a computer program. he computer program, when executed by a processor, performs the method according to any one of the methods provided in the embodiment of the present disclosure.

According to the message indication method and apparatus, the device and the storage medium provided by the embodiments of the present disclosure, a bypass situation of the message corresponding to the SID information is indicated by the message indication identifier in the SID information, so that the message is forwarded or discarded on the basis of the bypass situation. The problem of a waste of forwarding resources caused by a loop formed by a service message between provide edges is solved, and the user experience is improved.

With regard to the above embodiments and other aspects of the present disclosure and their implementations, more descriptions are provided in the description of the drawings, specific implementations and claims.

DETAILED DESCRIPTION OF THE EMBODIMENTS

In order to make the objectives, the technical solutions, and the advantages of the present disclosure clearer, the embodiments of the present disclosure will be described in detail below in combination with the accompanying drawing. It should be noted that the embodiments in the present disclosure and features in the embodiments may be randomly combined with each other without conflicts.

The steps shown in the flowcharts of the drawings may be executed in a computer system of a group of computer-executable instructions, for example. Furthermore, a logic order is shown in the flow diagram, but in some cases, the steps shown or described can be executed in an order different from this order.

First, an SRv6 technology is briefly introduced.

In network communication, segment routing (SR) is a source routing technology. When this technology is adopted, a forwarding point does not need to perceive a service state, but only needs to maintain the topology point information, which can achieve decoupling between the number of service instances and a network, thus greatly improving the network's ability to support ubiquitous connections and extensibility. The principle of SR is that a source node pushes an instruction carrying routing information into a message header, and an intermediate forwarding point pops up relevant instructions hop by hop to forward a message. The SR technology considers two kinds of encapsulations for a data plane: multi-protocol label switching (MPLS) encapsulation and Internet protocol version 6 (IPv6) encapsulation. An MPLS forwarding plane can be applied to an SR model without any modification. IPV6 defines a new routing header type (RHT) for SR, which defines an SR related routing extension header and provides a source-based routing capability.

In an SR network, an existing local underlay protection technology is a topology independent loop-free alternative (TI-LFA), which is defined in a draft-ietf-rtgwg-segment-routing-ti-lfa file and can be used for local protection in an area. When a point of local repair (PLR) detects that a primary link or a primary next-hop node fails, the PLR can quickly switch traffic to a backup path. The backup path can be very simple, such as only including a single link or node, or can be very complex, such as including a segment list.

However, this scheme is the protection of anSRv6 tunnel on an underlay layer, and does not involve the protection of services on an overlay layer.

Figure 2:
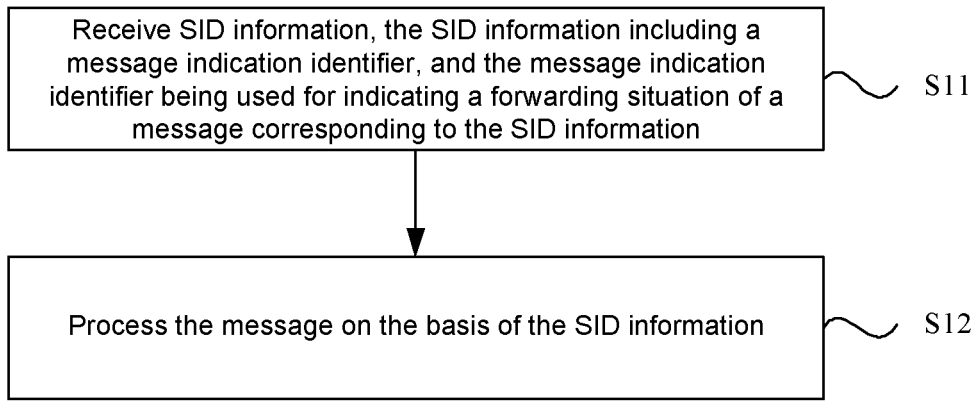
FIG. 2 is a flow diagram of a message indication method provided according to an embodiment of the present disclosure.

In one embodiment, a message indication method is provided, as shown in FIG. 2. The message indication method provided in the embodiment of the present disclosure mainly includes steps S11 and S12.

S11, SID information is received, the SID information including a message indication identifier, and the message indication identifier being used for indicating a forwarding situation of a message corresponding to the SID information.

S12, the message is processed on the basis of the SID information.

Figure 1:
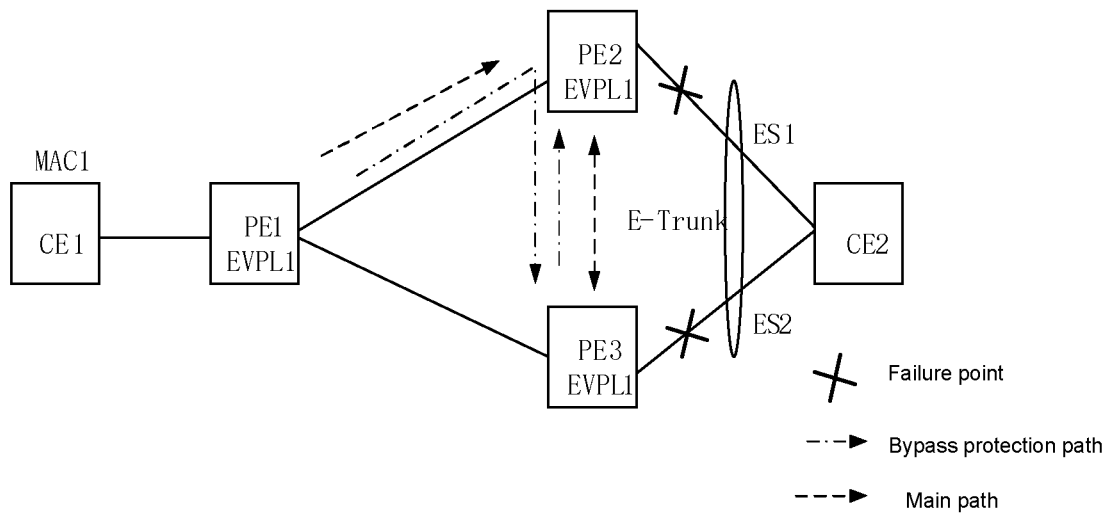
FIG. 1 is a structural diagram of a running service between PEs in an SRv6 VPN all active scenario.

The above message indication method is applied to a first node which can be any edge service device in a VPN, such as PE2 and PE3 in FIG. 1.

An SRv6 SID is used for identifying an ID of an SRv6 segment. A standard SRv6 SID is a 128 bit IPv6 address.

Figure 3:
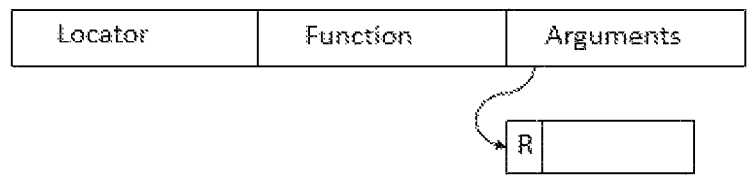
FIG. 3 is a schematic structural diagram of SID information provided according to an embodiment of the present disclosure.

As shown in FIG. 3, considering supporting the SRv6 network programmability, the SID information is usually composed of three parts: Locator, Function and Arguments (Args).

Locator is an identifier allocated to a network node in a network topology, which is used for routing and forwarding a data packet to the node. The Locator identifies location information. A route corresponding to the Locator will be published to a network by the node through an IGP to help other devices forward the data packet to a node that publishes the Locator. In the SRv6 SID, the Locator is variable in length to adapt to networks of different scales.

Function is used for expressing a forwarding action to be executed by the instruction, which is equivalent to an operation code of a computer instruction. In SRv6 network programming, different forwarding actions are expressed by different Functions, such as forwarding a data packet to a specified link, or looking up and forwarding a specified table.

Arguments (Args) is an optional field. It is a parameter corresponding to an instruction when the instruction is executed. These parameters may include traffic, services or any other relevant information.

In this embodiment, field Args in the SID information is used for representing a message indication identifier, and the message indication identifier is used for indicating a bypass situation of a message corresponding to the SID information.

In one embodiment, if the message indication identifier is a first state, the message indication identifier indicates that the message is a message normally forwarded by a custom edge; and if the message indication identifier is a second state, the message indication identifier indicates that the message is a message bypassed and forwarded by a provide edge after an AC link fails.

It should be noted that a normally forwarded message also refers to a non-bypassed message.

In a specific implementation, the message indication identifier is carried by field Arguments (Arg) in the SID information.

It should be noted that the message indication ID is carried by one bit in field Arguments in the SID information. That is, the message indication identifier only occupies a part of Arg, and other parts of Arg can also be used for other purposes.

Specifically, in this embodiment, one bit of Args is extended to identify whether the message is a bypassed message. The definition rules are as follows:

If Args is set to 0, it means that the message is a normally forwarded message, instead of a bypassed message.

If Args is set to 1, it means that the message is bypassed after an AC link fails. The bypassed message cannot be bypassed after a local AC link fails, but can only be discarded.

All the SRv6 SIDs are bound with a specific function. Information related to the function is stored in a local SID table. This table has three main purposes: recording which SIDs are defined on this node, specifying the function of each SID, and storing function parameters (such as OIF, NextHop, VRF . . . ). The function bound to each SID is recorded in Function.

One field of Args in the SID information is used for representing the message indication identifier, so that a control plane does not need to be extended too much, but only the length of the message indication identifier needs to be increased. This simplifies the previous method for allocating different functions for the bypassed message and the non-bypassed message and announcing different functions through the control plane, thus simplifying the control plane.

In a specific implementation, the SID information further includes a first type of SID information, and in a layer-2 virtual private network (L2VPN), the first type of SID information is used for instructing the message to be de-encapsulated and forwarding the message to a bound AC interface.

In this embodiment, the first type of SID information refers to End.DX2, which is commonly used in the L2VPN to instruct the message to be de-encapsulated and forwarding the message to a bound layer-2 interface.

In a specific implementation, the SID information further includes a second type of SID information, and in a flexible cross-connection scenario of an Ethernet virtual private network (EVPN), the second type of SID information is used for instructing the message to be de-encapsulated, looking up a layer-2 table for a virtual local area network (VLAN) and forwarding the message.

In this embodiment, the second type of SID information refers to the End. DX2V, which is commonly used in the flexible cross-connection scenario of the EVPN, and is used for instructing the message to be de-encapsulated, looking up the layer-2 table for the VLAN and forwarding the message.

In a specific implementation, the SID information further includes a third type of SID information, and in a unicast scenario of the EVPN, the third type of SID information is used for instructing the message to be de-encapsulated, looking up a layer-2 table for an MAC and forwarding the message.

In this embodiment, the third type of SID information refers to End. DT2U, which is commonly used in the unicast scenario in the EVPN, and is used for instructing the message to be de-encapsulated, looking up the layer-2 table for the MAC and forwarding the message.

In a specific implementation, a length of the message indication identifier is carried in a TLV field of the SID information in a prefix SID attribute of a border gateway protocol (BGP).

In a specific implementation, when the message indication identifier is the first state, the step that the message is processed on the basis of the SID information includes: after it is detected that the AC link fails, the first state of the message indication identifier is converted into the second state; and the message indication identifier in the second state and the message are sent to a second node.

The second node refers to other PE nodes in the network.

Specifically, when the first node queries that field Agr carried in the message is set to 0, it indicates that the message is normally forwarded message, which can be forwarded to other PE nodes.

Further, PE2 issues a BGP withdraw message to PE1 through a BGP EVPN neighbor relationship to withdraw a published automatic discovery route for an Ethernet virtual instance. After PE1 receives the BGP withdraw message, it is preferred to receive the automatic discovery route for an Ethernet virtual instance from PE3, and subsequent data traffic is directly forwarded to PE3.

In a specific implementation, when the message indication identifier is the second state, the step that the message is processed on the basis of the SID information includes: a local SID table is looked up to determine a forwarding action corresponding to the SID information carrying the message indication identifier in the second state; and the message is discarded after the AC link corresponding to the forwarding action fails.

If the first node queries that field Arg is set to 1, it indicates that the message is bypassed after the AC link fails, and the bypassed message cannot be forwarded to other PE nodes. Therefore, the message will be discarded.

In a specific embodiment, the step that a local SID table is looked up to determine a forwarding action corresponding to the SID carrying the message indication identifier in the second state includes:

an L2VPN instance is matched according to the first type of SID information, and an original layer-2 message is forwarded from the bound AC interface to a third node.

In a specific implementation, the step that a local SID table is looked up to determine a forwarding action corresponding to the SID information carrying the message indication identifier in the second state includes: an EVPN instance is matched according to the second type of SID information, and an AC link pointing to the third node is found in the VLAN table.

In a specific implementation, the step that a local SID table is looked up to determine a forwarding action corresponding to the SID information carrying the message indication identifier in the second state includes: an EVPN instance is matched according to the second type of SID information, and an AC link pointing to the third node is found in the MAC table.

Figure 4:
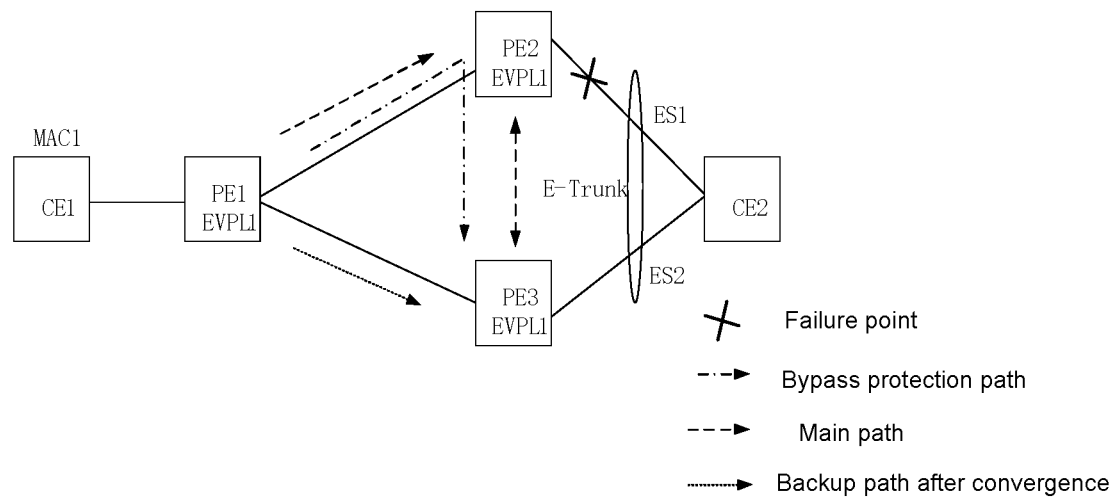
FIG. 4 is a schematic diagram of a link failure between PE2 and CE2.

In one embodiment, FIG. 4 is a schematic diagram of a link failure between PE2 and CE2. In an SRv6 EVPN VPWS all active scenario, CE1 is dual-homed to the PE2 and PE3, and an SRv6 EVPN VPWS service runs between the PEs. A fast reroute mechanism is deployed between PE2 and PE3. Assuming that a link between PE2 and CE2 fails, the following operations are performed.

Figure 5:
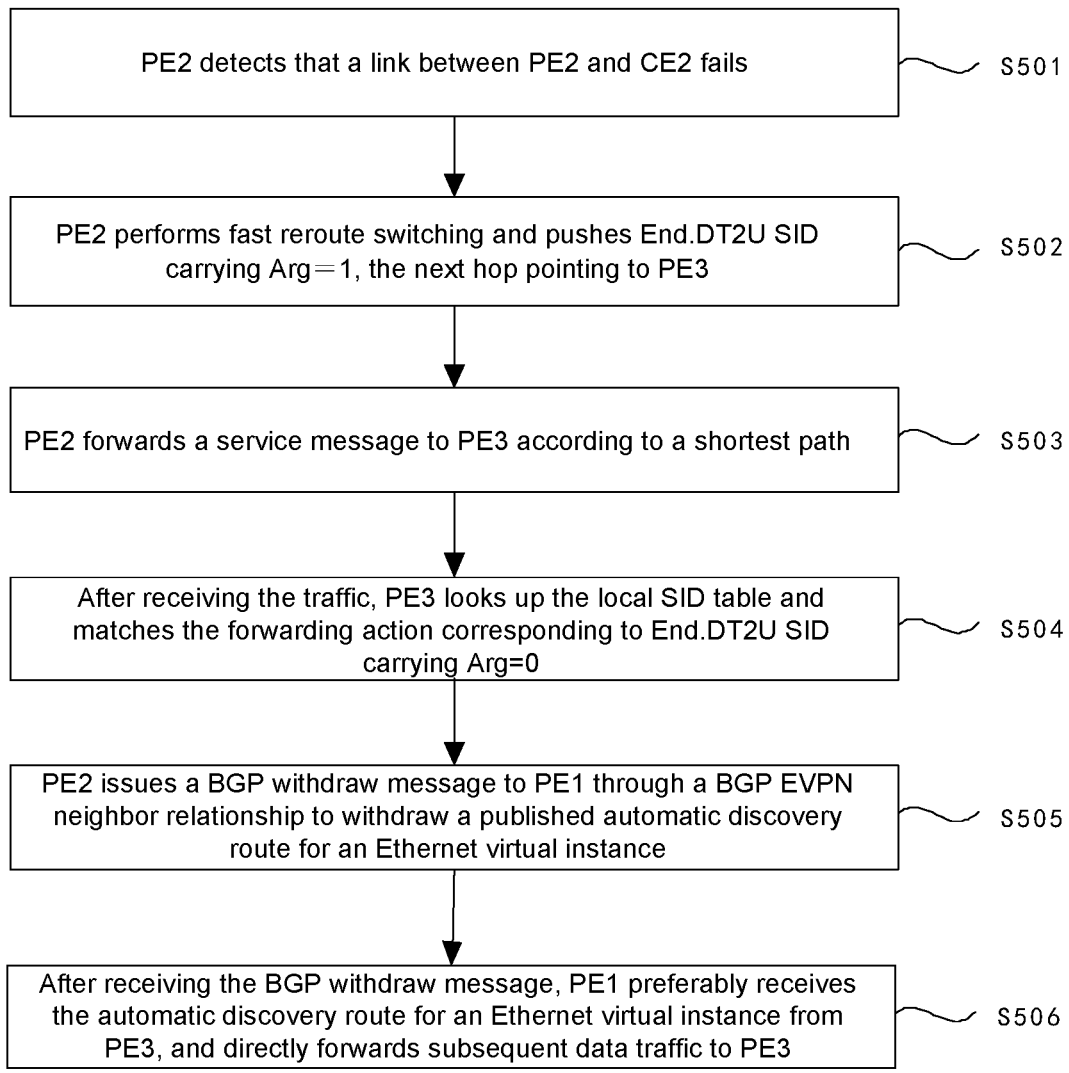
FIG. 5 is a flow diagram of a failure protection method for an SRv6 VPN provided in the present disclosure.

FIG. 5 is a flow diagram of a failure protection method for the SRv6 VPN provided by the present disclosure. As shown in FIG. 5. The failure protection of the SRv6 VPN mainly includes the following steps:

Step 501: PE2 detects that a link between PE2 and CE2 fails.

Step 502: PE2 performs fast reroute (FRR) switching and pushes End.DT2U SID carrying Arg=1, the next hop pointing to PE3.

Occupying one bit of field Arg represents that the message is bypassed after the AC link fails.

Correspondingly, the control plane also needs to carry the extended SRv6 SID Arg in an SID information sub-TLV in the prefix SID attribute of the BGP and represent an Arg length.

Step 503: PE2 forwards a service message to PE3 according to a shortest path.

Step 504: After receiving the traffic, PE3 looks up the local SID table and matches the forwarding action corresponding to End.DT2U SID carrying Arg=0.

Specifically, when PE3 queries that field Agr carried in the message is set to 0, it indicates that the message is normally forwarded message, which can be forwarded to other PE nodes.

The local SID table s looked up to match the forwarding action corresponding to End.DT2U SID carrying Arg Length=1.

The specific operation is to remove an IPV6 message header, then match, according to End.DT2U SID, the EVPN instance, and find the AC link pointing to CE2 from the MAC table. It should be noted that a bit width and position of Arg encapsulated in PE2 are completely encapsulated by PE3 in a signaling layer through instructions in SID Structure Sub-Sub-TLV, which can ensure that the message can be matched with a 127 bit prefix IPV6 route. The route corresponds to End.DT2U SID. The same 127 bit prefix will be matched no matter whether the value of Arg encapsulated in PE2 is 0 or 1.

Step 505: PE2 issues a BGP withdraw message to PE1 through a BGP EVPN neighbor relationship to withdraw a published automatic discovery route for an Ethernet virtual instance.

Step 506: After receiving the BGP withdraw message, PE1 preferably receives the automatic discovery route for an Ethernet virtual instance from PE3, and directly forwards subsequent data traffic to PE3.

Figure 6:
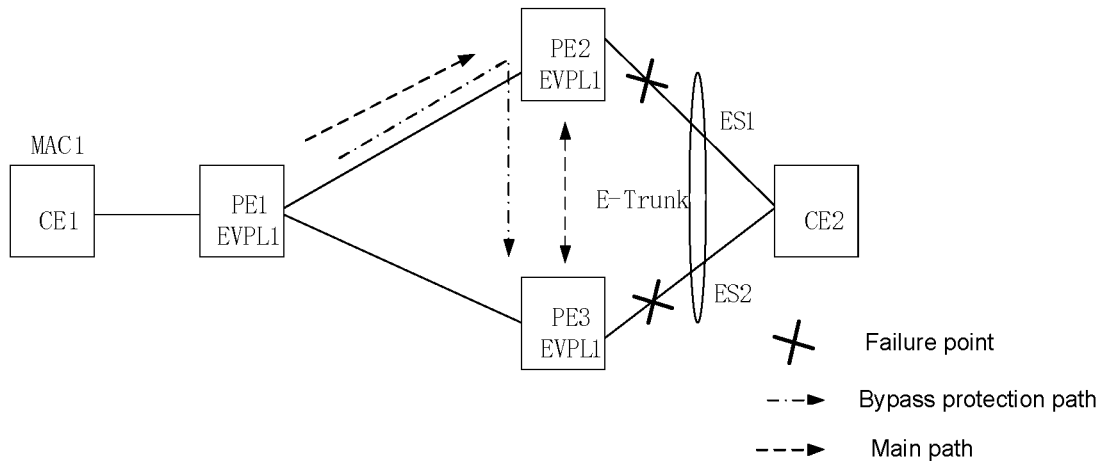
FIG. 6 is a schematic diagram illustrating that both of a link between PE2 and CE2 and a link between PE3 and CE2 fail.
Figure 7:
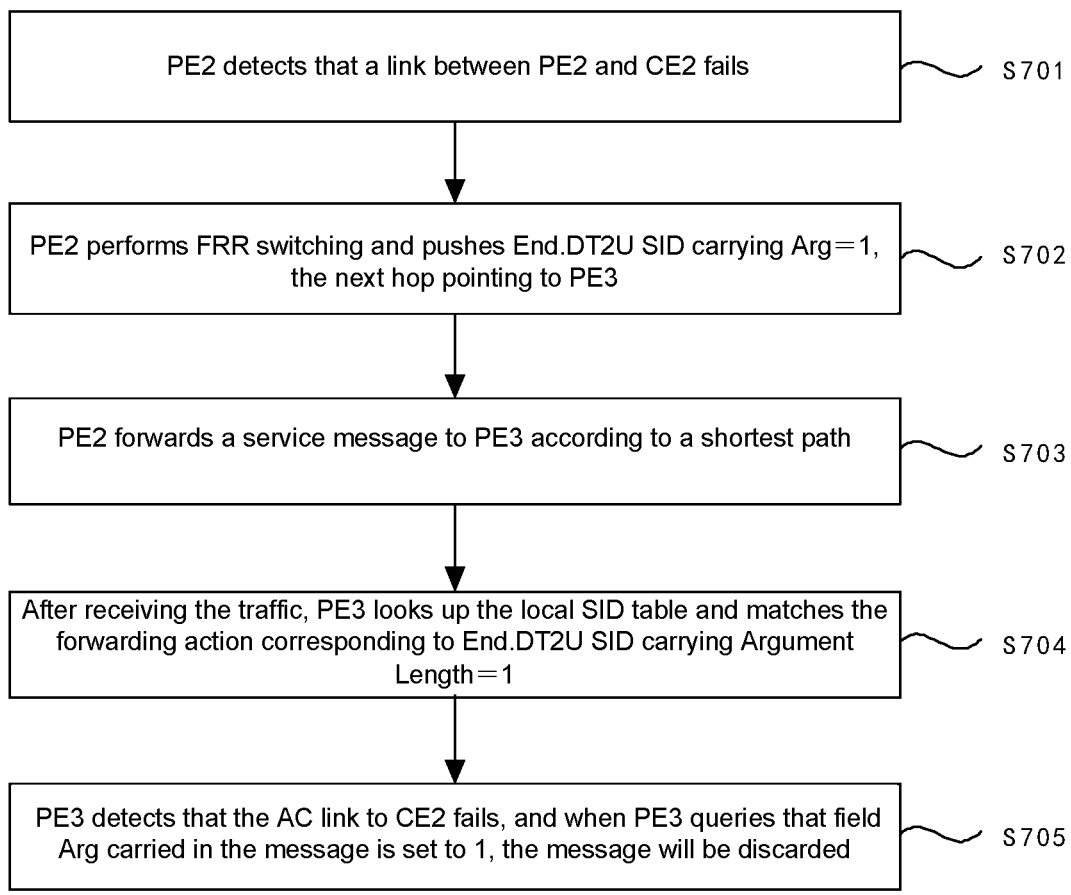
FIG. 7 is a flow diagram of a failure protection method for an SRv6 VPN provided in the present disclosure.

FIG. 7 is a flow diagram of a failure protection method of the SRv6 VPN provided in the present disclosure. The scenario is shown in FIG. 6. In this scenario, a link between PE2 and CE2 and a link between PE3 and CE2 fails at the same time.

Step 701: PE2 detects that a link between PE2 and CE2 fails.

Step 702: PE2 performs FRR switching and pushes End.DT2U SID carrying Arg=1, the next hop pointing to PE3.

Occupying one bit of field Arg represents that the message is bypassed after the AC link fails.

Correspondingly, the control plane also needs to carry a message indication identifier length in an SID information sub-TLV in the prefix SID attribute of the BGP.

Specifically, a sub-TLV in the SID information sub-TLV carries the message indication identifier length.

Step 703: PE2 forwards a service message to PE3 according to a shortest path.

Step 704: After receiving the traffic, PE3 looks up the local SID table and matches the forwarding action corresponding to End.DT2U SID carrying Argument Length=1.

The local SID table s looked up to match the forwarding action corresponding to End.DT2U SID carrying Arg Length=1. The specific operation is to remove an IPV6 message header, then match, according to End.DT2U SID, the EVPN instance, and find the AC link pointing to CE2 from the MAC table.

Step 705: PE3 detects that the AC link to CE2 fails, and when PE3 queries that field Arg carried in the message is set to 1, the message will be discarded.

Since field Arg is set to 1, it indicates that the message is bypassed after the AC link fails, and the bypassed message cannot be forwarded to other PE nodes. Therefore, the message will be discarded.

Figure 8:
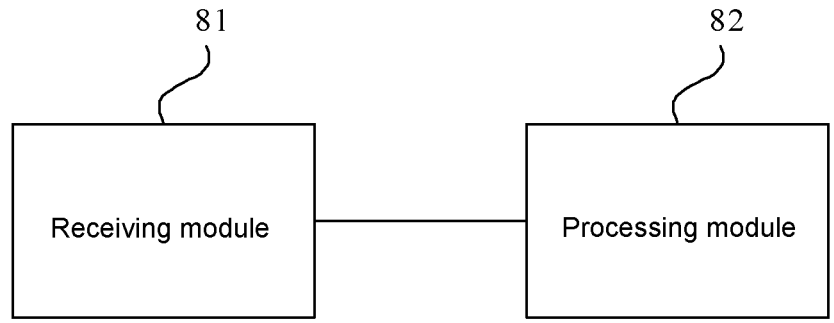
FIG. 8 is a schematic structural diagram of a message indication apparatus provided according to an embodiment of the present disclosure.

In one embodiment, a message indication apparatus is provided, as shown in FIG. 8. The message indication apparatus provided in the embodiment of the present disclosure mainly includes a receiving module 81 and a processing module 82.

The receiving module 81 is configured to receive SID information, the SID information including a message indication identifier, and the message indication identifier being used for indicating a bypass situation of a message corresponding to the SID information.

The processing module 82 is configured to process the message on the basis of the SID information.

In one embodiment, if the message indication identifier is a first state, the message indication identifier indicates that the message is a message normally forwarded by a custom edge; and if the message indication identifier is a second state, the message indication identifier indicates that the message is a message bypassed and forwarded by a provide edge after an AC link fails.

In a specific implementation, the message indication identifier is carried by field Arg in the SID information.

In a specific implementation, the SID information further includes a first type of SID information, and in an L2VPN, the first type of SID information is used for instructing the message to be de-encapsulated and forwarding the message to a bound AC interface.

In a specific implementation, the SID information further includes a second type of SID information, and in a flexible cross-connection scenario of an EVPN, the second type of SID information is used for instructing the message to be de-encapsulated, looking up a layer-2 table for a VLAN and forwarding the message.

In a specific implementation, the SID information further includes a third type of SID information, and in a unicast scenario of the EVPN, the third type of SID information is used for instructing the message to be de-encapsulated, looking up a layer-2 table for an MAC and forwarding the message.

In a specific implementation, a length of the message indication identifier is carried in a TLV field of the SID information in a prefix SID attribute of a BGP.

In a specific implementation, when the message indication identifier is the first state, the action of processing message on the basis of the SID information includes: after it is detected that the AC link fails, converting the first state of the message indication identifier into the second state; and sending the message indication identifier in the second state and the message to a second node.

In a specific implementation, when the message indication identifier is the second state, the action of processing the message on the basis of the SID information includes: looking up a local SID table to determine a forwarding action corresponding to the SID information carrying the message indication identifier in the second state; and discarding the message after the AC link corresponding to the forwarding action fails.

In a specific embodiment, the action of looking up a local SID table to determine a forwarding action corresponding to the SID carrying the message indication identifier in the second state includes:

matching an L2VPN instance according to the first type of SID information, and forwarding an original layer-2 message from the bound AC interface to a third node.

In a specific implementation, the action of looking up a local SID table to determine a forwarding action corresponding to the SID information carrying the message indication identifier in the second state includes: matching an EVPN instance according to the second type of SID information, and finding an AC link pointing to the third node in the VLAN table.

In a specific implementation, the action of looking up a local SID table to determine a forwarding action corresponding to the SID information carrying the message indication identifier in the second state includes: matching an EVPN instance according to the second type of SID information, and finding an AC link pointing to the third node in the MAC table.

The message indication apparatus provided by the embodiments of the present disclosure can perform the message indication method provided by any embodiment of the present disclosure, and has corresponding functional modules for performing the method and beneficial effects. For technical details not described in detail in this embodiment, a reference is made to the message indication method provided in any embodiment of the present disclosure.

It is worth noting that in the above embodiments of the message indicating apparatus, various units and modules included are only divided according to the functional logic, but not limited to the above division, as long as corresponding functions can be achieved. In addition, the specific names of the various functional unit are only for the convenience of distinguishing from each other, and are not intended to limit the protection scope of the present disclosure.

Figure 9:
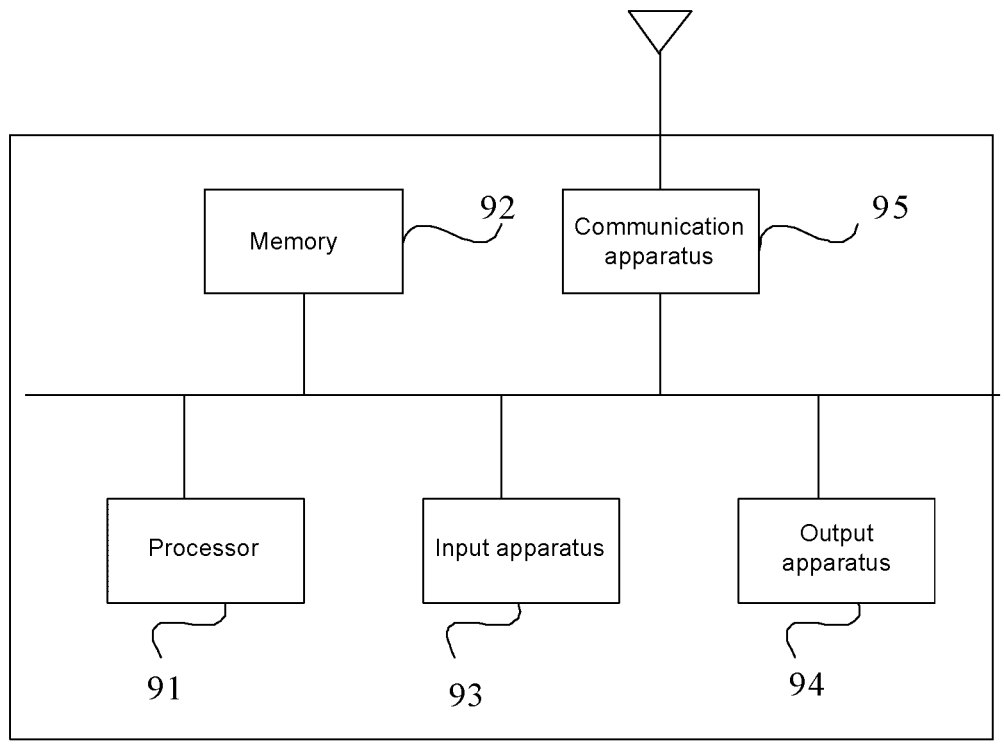
FIG. 9 is a schematic structural diagram of a device provided according to an embodiment of the present disclosure.

An embodiment of the present disclosure further provides a device. FIG. 9 is a schematic structural diagram of a device provided by the embodiments of the present disclosure. As shown in FIG. 9, the device includes a processor 91, a memory 92, an input apparatus 93, an output apparatus 94 and a communication apparatus 95. The number of the processor 91 in the device may be one or more. One processor 91 is taken as an example in FIG. 9. The processor 91, the memory 92, the input apparatus 93 and the output apparatus 94 in the device can be connected through a bus or in other ways. Bus connection is taken as an example in FIG. 9.

As a computer-readable storage medium, the memory 92 may be configured to store software programs, and computer-executable programs, and modules, such as program instructions/modules (such as message indication in the message indication apparatus) corresponding to the message indication method in the embodiments of the present disclosure. The processor 91 runs the software programs, instructions, and modules stored in the memory apparatus 92, so as to perform various functional applications and data processing of the device, thus implementing any method provided in the embodiments of the present disclosure.

The memory 92 may mainly include a program storage region and a data storage region. The program storage region may store an operating system and an application program required by at least one function. The data storage region may store data created according to the use of the device and the like. In addition, the memory 92 may include a high-speed random access memory, and may further include a non-volatile memory, such as at least one magnetic disk storage device, a flash memory device, or other volatile solid-state storage devices. In some examples, the memory 92 may further include a memory remotely provided with respect to the processor 91, and these remote memories may be connected to the device through a network. Examples of the above network include, but are not limited to, the Internet, an intranet, a local area network, a mobile communication network, and combinations thereof.

The input apparatus 93 may be configured to receive input numeric or character information, and generate key signal inputs related to user settings and function control of the device. The output apparatus 94 may include a display screen and other display devices.

The communication apparatus 95 may include a receiver and a transmitter. The communication apparatus 95 is configured to perform information transmitting and receiving communication according to control of the processor 91.

in one exemplary implementation, an embodiment of the present disclosure further provides a storage medium including computer-executable instructions which, when executed by a computer processor, is configured to execute the message indication method, including:

receiving SID information, the SID information comprising a message indication identifier, and the message indication identifier being used for indicating a forwarding situation of a message corresponding to the SID information; and processing the message on the basis of the SID information.

Of course, in the storage medium provided in the embodiment of the present disclosure and including the computer-executable instructions, the computer-executable instructions are not limited to operations of the method described above, and may also perform related operations in the message indication method provided in any embodiment of the present disclosure.

Through the description of the above implementations, those skilled in the art can clearly understand that the present disclosure can be implemented by means of software and necessary general hardware, of course, it can also be implemented by hardware, but in many cases, the former is better. Based on such an understanding, essential parts or parts that make contributions to the prior art of the technical solutions of the present disclosure may be embodied by means of software products. The computer software products are stored in a computer-readable storage medium, such as a floppy disk of a computer, a read-only memory (ROM), a random access memory (RAM), a flash, a hard disk or an optical disk, and the like, and include several instructions to cause a computer device (which may be a personal computer, a server, or a network device) to perform the methods in the various embodiments of the present disclosure.

The above embodiments are only exemplary embodiments of the present disclosure, and are not intended to limit the protection scope of the present disclosure.

Those skilled in the art should understand that a term user terminal covers any suitable type of wireless user equipment, such as a mobile phone, a portable data processing apparatus, a portable web browser, or a vehicle-mounted mobile station.

In general, various embodiments of the present disclosure may be implemented in hardware or special purpose circuits, software, logic, or any combination thereof. For example, some aspects may be implemented in hardware, while others may be implemented in firmware or software that can be executed by a controller, microprocessor, or other computing apparatuses, although the present disclosure is not limited thereto.

The embodiments of the present disclosure can be implemented by a data processor of a mobile apparatus executing computer program instructions, such as in a processor entity, or through hardware, or through a combination of software and hardware. The computer program instructions can be assembly instructions, instruction set architecture (ISA) instructions, machine instructions, machine related instructions, microcodes, firmware instructions, state setting data, or source codes or target codes written in any combination of one or more programming languages.

The block diagrams of any logic flow in the drawings of the present disclosure may represent program steps, or may represent interconnected logic circuits, modules and functions, or may represent a combination of program steps with logic circuits, modules and functions. The computer programs can be stored in a memory. The memory may be of any type suitable for a local technical environment and may be implemented using any suitable data storage technology, such as, but not limited to, the ROM, the RAM, an optical memory apparatus and a system (a digital multifunctional compact disc DVD or CD), and the like. The computer-readable medium may include a non-transient storage medium. The data processor can be of any type suitable for the local technical environment, such as, but not limited to, a general purpose computer, a dedicated computer, a microprocessor, a digital signal processor (DSP), an application specific integrated circuit (ASIC), a field programmable logic array (FGPA) and a processor based on a multi-core processor architecture.

Through exemplary and non-limiting examples, a detailed description of the exemplary embodiments of the present disclosure has been provided above. However, considering the drawings and claims, it is apparent to those skilled in the art that various modifications and adjustments are made to the above embodiments, but the modifications and adjustments do not depart from the scope of the present disclosure. Therefore, an appropriate scope of the present disclosure will be determined according to the claims.

What is claimed is:

1. A message indication method, the method being applied to a first node, and comprising:

receiving segment identifier (SID) information, the SID information comprising a message indication identifier, and the message indication identifier being used for indicating a forwarding situation of a message corresponding to the SID information; and processing the message on the basis of the SID information;

wherein if the message indication identifier is a first state, the message indication identifier indicates that the message is a message normally forwarded by a custom edge; and if the message indication identifier is a second state, the message indication identifier indicates that the message is a message bypassed and forwarded by a provide edge after a Attachment Circuit (AC) link fails.

2. The method according to claim 1, wherein the message indication identifier is carried by field Arguments in the SID information.

3. The method according to claim 1, wherein the SID information further comprises a first type of SID information, and in a layer-2 virtual private network (L2VPN), the first type of SID information is used for instructing the message to be de-encapsulated and forwarding the message to a bound AC interface.

4. The method according to claim 1, wherein the SID information further comprises a second type of SID information, and in a flexible cross-connection scenario of an Ethernet virtual private network (EVPN), the second type of SID information is used for instructing the message to be de-encapsulated, looking up a layer-2 table for a virtual local area network (VLAN) and forwarding the message.

5. The method according to claim 1, wherein the SID information further comprises a third type of SID information, and in a unicast scenario of the EVPN, the third type of SID information is used for instructing the message to be de-encapsulated, looking up a layer-2 table for an MAC and forwarding the message.

6. The method according to claim 1, wherein a length of the message indication identifier is carried in a TLV field of the SID information in a prefix SID attribute of a border gateway protocol (BGP).

7. The method according to claim 1, wherein when the message indication identifier is the first state, the processing the message on the basis of the SID information comprises:

after it is detected that the AC link fails, converting the first state of the message indication identifier into the second state; and sending the message indication identifier in the second state and the message to a second node.

8. The method according to claim 1, wherein when the message indication identifier is the second state, the processing the message on the basis of the SID information comprises:

looking up a local SID table to determine a forwarding action corresponding to the SID information carrying the message indication identifier in the second state; and discarding the message after the AC link corresponding to the forwarding action fails.

9. The method according to claim 8, wherein the looking up a local SID table to determine a forwarding action corresponding to the SID carrying the message indication identifier in the second state comprises:

matching an L2VPN instance according to the first type of SID information, and forwarding an original layer-2 message from the bound AC interface to a third node.

10. The method according to claim 8, wherein the looking up a local SID table to determine a forwarding action corresponding to the SID information carrying the message indication identifier in the second state comprises:

matching an EVPN instance according to the second type of SID information, and finding an AC link pointing to the third node from the VLAN table.

11. The method according to claim 8, wherein the looking up a local SID table to determine a forwarding action corresponding to the SID information carrying the message indication identifier in the second state comprises:

matching an EVPN instance according to the third type of SID information, and finding an AC link pointing to the third node from the MAC table.

12. A message indication apparatus, the apparatus being configured to a first node, and comprising:

a receiving module, configured to receive SID information, the SID information comprising a message indication identifier, and the message indication identifier being used for indicating a bypass situation of a message corresponding to the SID information; and a processing module, configured to process the message on the basis of the SID information;

wherein if the message indication identifier is a first state, the message indication identifier indicates that the message is a message normally forwarded by a custom edge; and if the message indication identifier is a second state, the message indication identifier indicates that the message is a message bypassed and forwarded by a provide edge after a Attachment Circuit (AC) link fails.

13. A device, comprising:

one or more processors;

a memory, configured to store one or more programs;

wherein one or more programs, when executed by one or more processors, cause the one or more processors to perform the method according to claim 1.

14. A non-transitory computer-readable storage medium, which stores a computer program, wherein the computer program, when executed by a processor, performs the method according to claim 1.

15. A device, comprising:

one or more processors;

a memory, configured to store one or more programs;

wherein one or more programs, when executed by one or more processors, cause the one or more processors to perform the method according to claim 2.

16. A device, comprising:

one or more processors;

a memory, configured to store one or more programs;

wherein one or more programs, when executed by one or more processors, cause the one or more processors to perform the method according to claim 3.

17. A device, comprising:

one or more processors;

a memory, configured to store one or more programs;

wherein one or more programs, when executed by one or more processors, cause the one or more processors to perform the method according to claim 4.

18. A device, comprising:

one or more processors;

a memory, configured to store one or more programs;

wherein one or more programs, when executed by one or more processors, cause the one or more processors to perform the method according to claim 5.

* * * * *